2,950,312

PROCESS FOR PRODUCING N-TRINITROETHYL URETHANES, AMIDES, AND UREAS

Therése Quadflieg, Hamburg-Blankensee, Germany, assignor to Nitroglycerin Aktiebolaget, Gyttorp, Sweden, a corporation of Sweden No Drawing. Filed Oct. 25, 1957, Ser. No. 692,249

Claims priority, application Sweden Oct. 26, 1956

2 Claims. (Cl. 260—482)

This invention relates to a process for producing N-trinitroethylsubstituted acid amides.

It is known that the manufacture of alkylated acid amides by substitution of an alkyl group for a hydrogen atom attached to the nitrogen of the amide as a rule does not proceed satisfactorily. On account hereof, the technical methods for producing N-alkyl acid amides do not start from acid amides but from the chlorides or esters of the corresponding acids which are reacted with primary or secondary amines. Generally this conversion requires a long reaction time, heating and, maybe, also working under pressure.

It has now according to the present invention been found that N-trinitroethylsubstituted acid amides may be obtained by a simple and rapidly proceeding reaction by causing trinitromethan (nitroform) to react with oxymethylene acid amides (methylol acid amides), in the presence of a suitable solvent.

Production of a trinitroethylsubstituted acid amide compound, namely ditrinitroethylurea, has been described in the U.S. Patent No. 2,731,460 of July 3, 1952, but in this case the conversion takes place by reacting trinitroethanol with the acid amide (urea). In comparison herewith, the method for producing N-trinitroethylsubstituted acid amides according to the present invention involves several considerable advantages. Thus, conversion takes place at a considerably lower temperature which in certain cases may be of importance, the speed of reaction is considerably greater and no side reactions occur.

As starting materials in the process according to the invention nitroform $HC(NO_2)_3$ and an oxymethylene compound (methylol) of the general formula

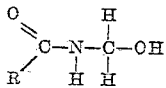

are used in which formula R represents a lower alkyl, lower oxyalkyl, phenyl or $NH_2$—.

In the conversion the methylol group of the acid amide reacts with the nitroform with removal of water according to the formula:

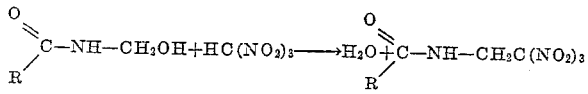

The reaction may be carried out with equimolecular amounts of the reaction components but the reaction proceeds in the same manner also in case of using excess of methylol amide or nitroform.

In the reaction nitroamides of the general formula

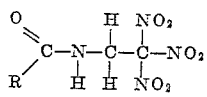

are formed where R has the same significance as indicated above.

Examples of oxymethylene compounds of primary acid amides which may be used in the process according to the invention are, among other, the following, which may be obtained by reaction of formaldehyde with mono or polyamides of carboxylic acids (aliphatic or aromatic, substituted or non-substituted): methylolformamide, methylolacetamide, dimethylolsuccinic acid diamide, methylolethylurethan, methylolbenzamide, methylolnitrobenzamide, methylolurea, methylolmethylurea, methylolphenylurea, dimethylolurea.

By the reaction with nitroform the corresponding trinitroethylsubstituted compounds are obtained, namely trinitroethylformamide, trinitroethylacetamide, ditrinitroethylsuccinic acid diamide, trinitroethylethylurethan, trinitroethylbenzamide, trinitroethylnitrobenzamide, trinitroethylurea, N-trinitroethyl-N'-methylurea, N-phenyl-N'-trinitroethylurea, and N-N'-ditrinitroethylurea.

The N-trinitroethylsubstituted acid amides produced according to the invention are obtained in a high degree of purity. They are solid or liquid odourless substances, insoluble in water but soluble in most organic solvents.

The compounds have been found to possess useful properties for many various purposes. For example, many of them are excellent explosives and can be used as such or as components in explosive mixtures, and further as propellants for rockets, alone or in mixture. They may also be used as components in pyrotechnic compositions and firing or ignition compositions of different kinds. Further, they may be added for increasing the cetane number of diesel oils. In addition, the products are useful as starting materials for synthesis of other products. For example, they may be converted by reduction to hydroxyl amines and amines which may then may be subjected to further conversions.

Example 1

A neutral or weak alkaline solution of 1 mol. (89 g.) of solid acetamidemethylol in 250 ml. water is mixed with 1 mol. (151 g.) nitroform dissolved in 250 ml. water. After storage of the reaction mixture for several hours at room temperature or also after heating to 50–70° C. during 10 minutes, a white substance begins to precipitate. After preformed conversion the precipitate, which consists of needle-shaped white crystals of trinitroethylacetamide, $C_4H_6O_7N_4$, is thoroughly washed with water. Without recrystallization, the trinitroethylacetamide so obtained has a nitrogen content of 25.3% (theoretical value 25.2%). The substance has a melting point of 88–90° C., and is insoluble in water but readily soluble in ether and aceton. It may be recrystallized from carbon tetrachloride. The yield is 75% of the theoretical value.

Example 2

1 mol. (120 g.) of ethylurethanmethylol is dissolved in 1000 ml. water at 35° C. A 20% aqueous solution of 1 mol. nitroform of about the same temperature is added dropwise, while stirring, and hereby the mixture successively becomes turbid. It is then heated for a short time to 80° C. whereupon the solution is left to stand some time at room temperature and hereby a heavy yellow oil precipitates on the bottom of the reaction vessel. It is separated from the main part of the liquid and is washed several times with cold water. The turbid, light yellow oil so obtained, is dried in a desiccator over $P_2O_5$ and becomes then clear and transparent. For continued purification the oil may be dissolved in boiling hexane. On cooling, the oil again precipitates and it is then separated from the upper phase of hexane and dried. The light yellow odourless, viscous liquid so obtained is insoluble in cold as well as in hot water. It consists of trinitroethylurethan, $C_5H_8O_8N_4$, with a nitrogen content of 22.1% (theoretical value for said substance, 22.2%). The yield is about 90%.

Instead of the water soluble monomer used above it is also possible to use a water insoluble polymeric modification of ethylurethanmethylol for the conversion. In this case the finely powdered dry methylol compound is added to a warm aqueous solution of nitroform in portions, while stirring effectively. The polymer is thereby apparently splitted into nitroform whereupon the conversion takes place. The further treatment may then be carried out as indicated above.

Example 3

A mixture of 1 mol. (151 g.) benzamide, 3 g. soda, 150 ml. water and 98 g. of a 40% formaldehyde solution is heated and shaken until dissolution has taken place, and the solution is then left to stand over night at room temperature. Hereby methylolbenzamide is formed and precipitates as a solid white powder which need not necessarily be isolated. The reaction mixture forms a slurry to which is added 2000 ml. water. The resulting mixture is then added, while stirring, to a mixture of 1 mol. (151 g.) nitroform in 2000 ml. water. The strongly yellow coloured reaction solution is heated for a short time to 80° C. and hereby a white solid substance is precipitated. In order to allow the conversion to proceed to the end, the reaction mixture is left to stand over night at room temperature. The abundant amount of precipitated fine white crystals are filtered off and washed thoroughly with water. They may be recrystallized from diluted methanol. The trinitroethylbenzamide, $C_9H_8O_7N_4$, so obtained has the melting point 102° C. and is insoluble in water. The nitrogen content of the compound was determined to 19.7% (theoretical value 19.5%). The compound may be nitrated to form trinitroethylnitrobenzamide.

Example 4

To a 40° C. warm solution of 1 mol (151 g.) nitroform in 1000 ml. water is added in the course of 5 minutes a solution of 0.5 mol. (60 g.) dimethylolurea in 1000 ml. water, while stirring effectively. Precipitation of a white substance begins immediately. The mixture is stirred effectively while maintaining the temperature at 40° C. for 5 minutes. After cooling to room temperature, the precipitate is separated from the light yellow mother lye, washed with water and dried. It consists of a white light powder of pure ditrinitroethylurea, $C_5H_6O_{13}N_8$, and is obtained in a yield of 77%. The melting point of the substance is 189–191° C. and its content of nitrogen is 29.1% (theoretical value 29%).

Instead of solid dimethylolurea also a solution containing the components of this compound, e.g. 1 equivalent of urea and 2 equivalents of formaldehyde in the form of a concentrated neutral or weak alkaline formaldehyde solution, may be used and reacted with nitroform. After storage at room temperature without stirring for 22 hours a yield of 88% of ditrinitroethylurea was obtained.

Example 5

0.1 mol. dimethylolurea and 0.2 mol. nitroform are dissolved in 1000 ml. glacial acetic acid. The colourless solution is heated 10–20 minutes to 60° C. and then so much water is added thereto that opalescence will just occur. The reaction solution is then left to stand over night at room temperature and hereby a white precipitate is formed. It is separated from the yellow coloured mother lye and carefully washed with water. The product so formed is pure ditrinitroethylurea. Instead of glacial acetic acid, methanol may be used as solvent, for example.

Example 6

Water insoluble polymerized dimethylolurea is reacted with nitroform in the following manner: To a warm aqueous nitroform solution of about 15% the very finely pulverized dimethylolurea is added in portions, while stirring effectively. In the beginning a suspension is formed which is effectively stirred for further 15 minutes at a temperature of 60–70° C. On cooling, a white powder precipitates from the light yellow solution which powder is separated and carefully washed with water. It consists of ditrinitroethylurea having the melting point 189–191° C. and a nitrogen content of 29.3%.

Similarly, by conversion of the corresponding acid amide methylols with nitroform in aqueous solution the following compounds are obtained, for example:

Trinitroethylformamide, a solid white substance with the melting point 115° C.;

Trinitroethylnitrobenzamide, a solid white substance with the melting point 117° C.;

N-trinitroethyl-N'-methylurea, a solid white substance with the melting point 120–127° C.

What I claim is:

1. A process for producing trinitroethylsubstituted acid amides of the general formula

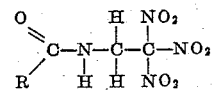

wherein R is a member selected from the group consisting of lower alkyl, lower oxyalkyl, phenyl and $NH_2$ which comprises reacting, in the presence of an inert solvent, nitroform with an oxymethylene compound of the general formula

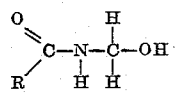

wherein R has the significance indicated above, and recovering the compound so produced.

2. The process of claim 1, wherein the inert solvent is water.

References Cited in the file of this patent
UNITED STATES PATENTS

| | | |
|---|---|---|
| 2,419,506 | Senkus | Apr. 22, 1947 |
| 2,467,212 | Kvalnes | Apr. 12, 1949 |
| 2,731,460 | Schenck et al. | Jan. 17, 1956 |